UNITED STATES PATENT OFFICE.

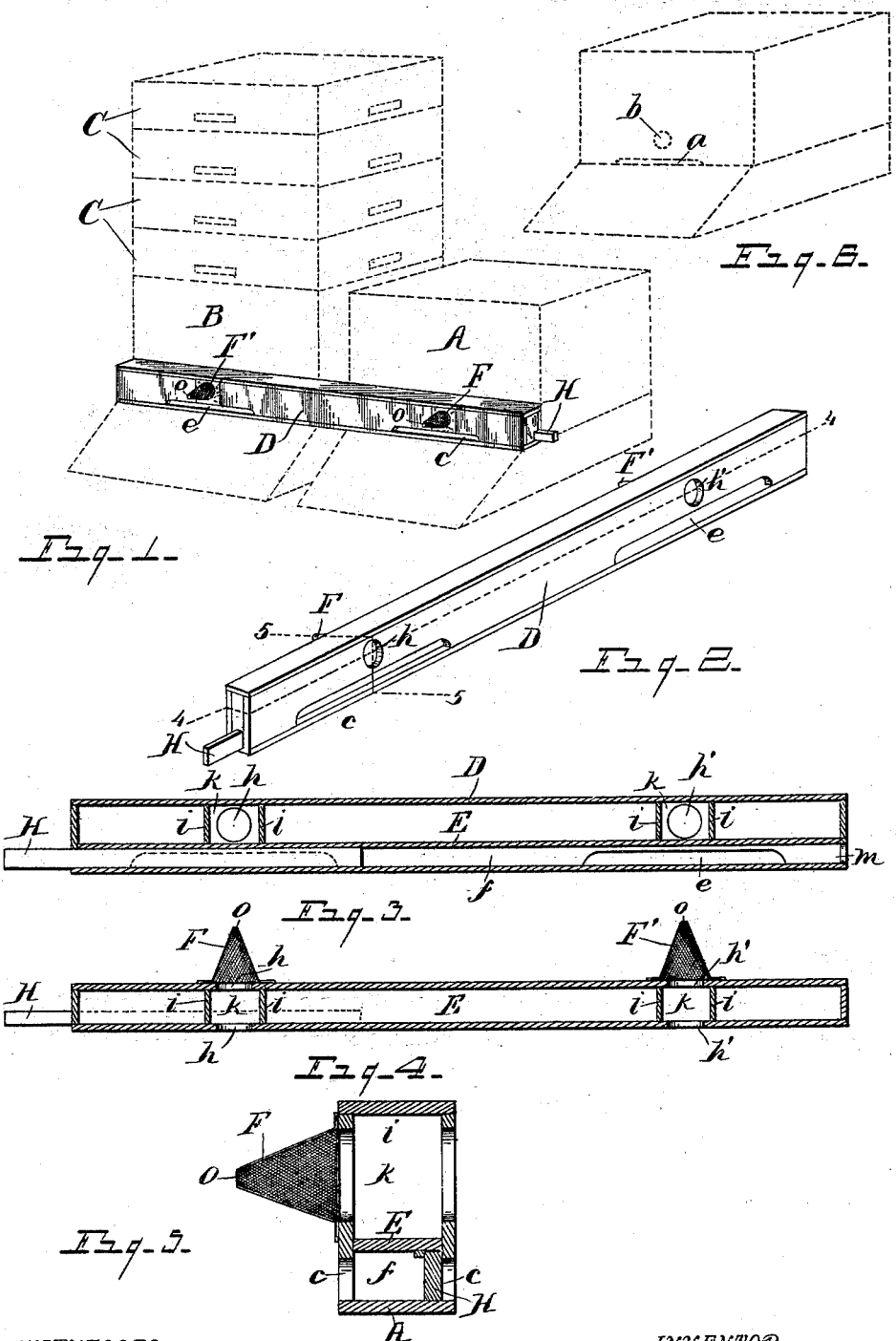

HERBERT P. LANGDON, OF EAST CONSTABLE, NEW YORK.

DEVICE FOR PREVENTING THE SWARMING OF BEES.

SPECIFICATION forming part of Letters Patent No. 509,438, dated November 28, 1893.

Application filed February 1, 1893. Serial No. 460,618. (No model.)

*To all whom it may concern:*

Be it known that I, HERBERT P. LANGDON, a citizen of the United States, residing at East Constable, in the county of Franklin, State of New York, have invented certain new and useful Improvements in Devices for Preventing the Swarming of Bees; and I do declare the following to be a full, clear, and exact description of the invention, such as will enable others skilled in the art to which it appertains to make and use the same, reference being had to the accompanying dawings, and to the letters of reference marked thereon, which form a part of this specification.

This invention relates to a device for preventing the swarming of bees, and consists in means for sucessively diverting or changing the field force from one hive into another, whereby the working bees are caused to alternate in reciprocal succession between two or more hives. This result is obtained by the device or trap illustrated in the accompanying drawings, in which—

Figure 1 is an isometrical view of a pair of hives provided with my improved device, the hives and super cases being shown by dotted lines. Fig. 2 is an enlarged isometrical view of the rear face of the trap. Fig. 3 is a vertical longitudinal section through said trap. Fig. 4 is a horizontal section on dotted line 4—4 of Fig. 2. Fig. 5 is a transverse section on dotted line 5—5 of Fig. 2. Fig. 6 is an isometrical view of the hive, shown by dotted lines.

Referring to the letters of reference, A and B indicate the hives respectively, and C indicates the super cases of said hives, Fig. 1 showing the cases of both hives upon hive B. The front of each hive is provided with an entrance $a$ at the base, and with an exit $b$, consisting of a circular aperture through the front of the hive above the entrance, as shown in Fig. 6.

D designates the device or trap for controlling the flying bees, by means of which they are caused to alternate between the hives. Said trap is composed of an oblong case or box, with closed sides and ends, and provided with a horizontal partition E running longitudinally thereof, which divides the box, forming a gallery or a passage-way $f$ at the bottom, extending from end to end thereof. Clearly shown in Figs. 3 and 5. The sides of said box or trap near each end, are provided with the opposed openings $c$ and $e$, respectively. These openings communicate with the gallery $f$ in the base of the trap, and are adapted to register with the entrances $a$ in the front of the hives, when the trap is in position, as shown in Fig. 1. Also formed in the sides of the trap, above said openings, are the opposed circular apertures $h$, $h'$, on each side of which are the transverse partitions $i$ forming a closed passage-way $k$ connecting said apertures. Secured to the front of the trap, over the outer ends of the openings $h$ $h'$ are the conical screens F, F', which are provided with an opening $o$ at their apexes, forming an escape or exit for the flying bees. These screen covered openings in the trap are adapted to coincide with the exit apertures $b$ in the hives when said trap is in place thereon. Each end of the trap is provided with an opening therein that communicates with the gallery $f$ as shown at $m$ in Fig. 3, and that receives the slide H, which, when inserted in said opening, is adapted to close the inner aperture, in the end of the trap in which it is inserted, that registers with the entrance $a$ in the front of the hive, clearly shown in Figs. 2, 3, and 4, leaving, however, the gallery $f$ unobstructed between the outer openings $c$, $e$.

The application of this device for the preventing of swarming, is as follows:—At the beginning of the honey season, when the bees are at work in the super cases, the trap is attached to the front of a series of hives, as shown in Fig. 1. The bees will then pass into and out of their respective hives through the entrance apertures $c$ and $e$ in the trap. By inserting the slide H in the end of the trap, as also shown in Fig. 1, the inner entrance of the trap will be closed at hive A, thereby excluding the bees from said hive, the flying bees therein being permitted to come out through the conical screen exit F. The super cases of hive A, are then placed upon hive B, as shown, which latter hive then holds the super cases of both hives. The working bees of hive A finding their entrance closed on their return, are attracted along the gallery $f$ by the buzzing of the bees at the entrance $e$ of hive B, and enter said hive. This withdrawal of the working bees from hive A, so impoverishes the nurse or brood bees left therein that they will not swarm, meanwhile work is going on, without interruption in the super cases on hive B, by the field force of both hives. At the expiration of a few days, the super cases on hive B are all placed upon hive A, the slide H is withdrawn from entrance c, thus opening said hive, and is inserted in the opposite end of the trap so as to close entrance e to hive B. The bees thus excluded from said hive will be called along the gallery f of the trap by the bees at entrance c, and with said bees will enter hive A, thereby causing the same conditions in hive B as were previously induced in the closed hive A, and at the same time allowing the field bees of both hives to work continuously in the super cases on the open hive A, the flying bees in hive B escaping through the screen exit F'. Within a week or so, the super cases are again placed upon hive B, and said hive is opened and hive A closed; then, after a few days, said cases are changed back to hive A, and so on alternately between said hives during the honey flow. This alternation in reciprocal succession of the working bees between the hives, and the concurrent transfer of the super cases, so disturbs and impoverishes the brood bees in the successively closed hives, that organization for swarming cannot be effected, thereby obviating prime swarming, and enabling the field bees of each hive to work without interruption through the entire honey season. Two or more hives may be connected in this way as is desired, or is found expedient.

While I have shown and described a specific form of trap, it is obvious that other devices may be employed to effect this alternation of the bees between the hives, without departing from the spirit of my invention.

Having thus fully set forth the invention, what I claim as new, and desire to secure by Letters Patent, is—

1. The combination of the hives, each having an entrance and an escape opening, the trap consisting of an oblong box having entrances that communicate with the entrances of the hive and having a gallery running longitudinally thereof that establishes communication between said entrances, the slide adapted to close the hive entrances at each end of the trap, whereby the field bees of both hives may be caused to successively work in each hive, as set forth.

2. The combination with the hives having independent entrances and exit openings, the trap consisting of an oblong box having opposite openings at each end through its front and rear sides, and having a gallery running longitudinally thereof connecting said end openings, said openings through the rear side of the trap registering with the entrance openings of the hives, said trap also having the conical screen escape openings that register with the exit opening in the hive, and the slide for closing the openings in the trap which registers with the hive entrances, whereby the working bees of either of the connected hives may be entirely excluded therefrom and diverted into the other hive, for the purposes set forth.

3. A bee-hive provided with an entrance, a slide to control said entrance, and a conical screen exit to permit of the escape of the flying bees when the hive is closed.

4. In combination with the hive, the trap provided with an entrance and having an escape aperture, each having independent communication with the hive, said escape-aperture having a conical screen covering with an opening at its apex, the slide for closing the hive entrance of the trap, substantially as set forth.

5. In combination with the hives having an entrance and an escape aperture, the trap having inner and outer entrances that communicate with the hives, and having a gallery or passage-way running longitudinally thereof connecting said entrances, said trap being also provided with escape apertures that communicate with the respective hives independently of the entrance openings, said escape-apertures being covered with a conical screen having an opening at its apex and the slide to close the entrances of the hives.

In testimony whereof I affix my signature in presence of two witnesses.

HERBERT P. LANGDON.

Witnesses:
   J. W. ALLEN,
   E. R. MAGOON.